F. A. DOLEZAL.
SHOCK ABSORBER FOR MOTOR VEHICLES.
APPLICATION FILED AUG. 4, 1920.
1,438,301.
Patented Dec. 12, 1922.
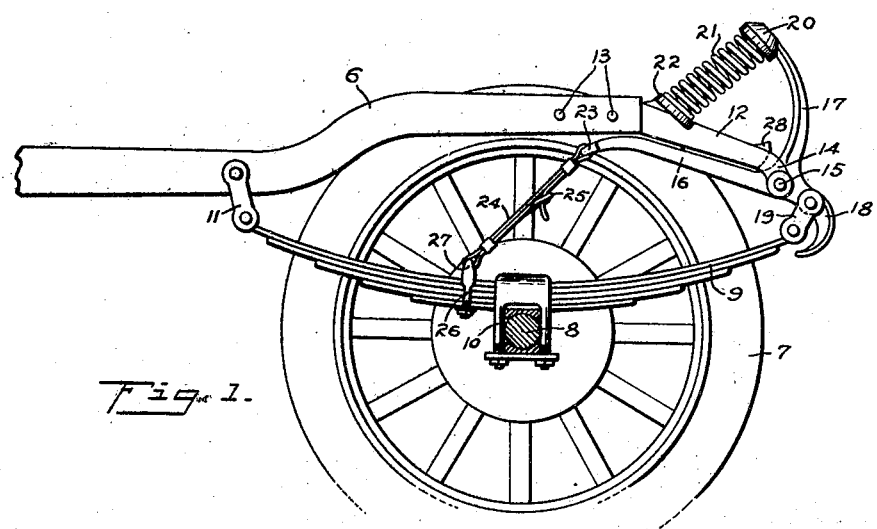
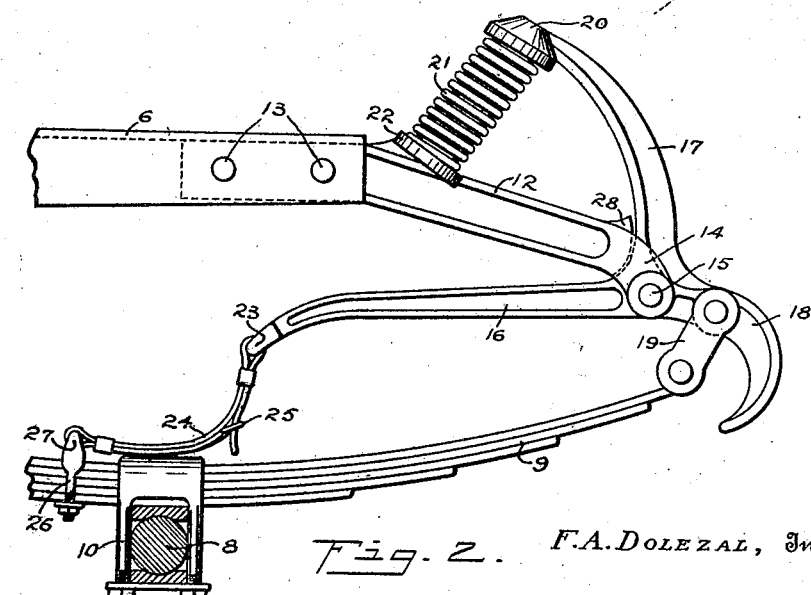
F. A. Dolezal, Inventor F. A. DOLEZAL.
SHOCK ABSORBER FOR MOTOR VEHICLES.
APPLICATION FILED AUG. 4, 1920.

1,438,301.

Patented Dec. 12, 1922.
2 SHEETS—SHEET 2.

F. A. Dolezal, Inventor

Witness
R. J. Honomichl.

By David O. Barnell,
Attorney.

Patented Dec. 12, 1922.

1,438,301

UNITED STATES PATENT OFFICE.

FRANK A. DOLEZAL, OF BRUNO, NEBRASKA.

SHOCK ABSORBER FOR MOTOR VEHICLES.

Application filed August 4, 1920. Serial No. 401,229.

*To all whom it may concern:*

Be it known that I, FRANK A. DOLEZAL, a citizen of the United States, and a resident of Bruno, in the county of Butler and State of Nebraska, have invented certain new and useful Improvements in Shock Absorbers for Motor Vehicles, of which the following is a specification.

My invention relates to improvements in shock-absorbing devices for application to the chassis of motor vehicles, of the type ordinarily using three-quarter elliptic springs. It is the object of my invention to provide a shock-absorber particularly adapted for use on vehicle frames of the type mentioned, and adapted to be attached to finished vehicles, as well as to be built into the original frame structure thereof. A further object of my invention is to provide a simple and efficient device of this character, the device being made up from parts which may be inexpensively manufactured and assembled.

Figure 3:
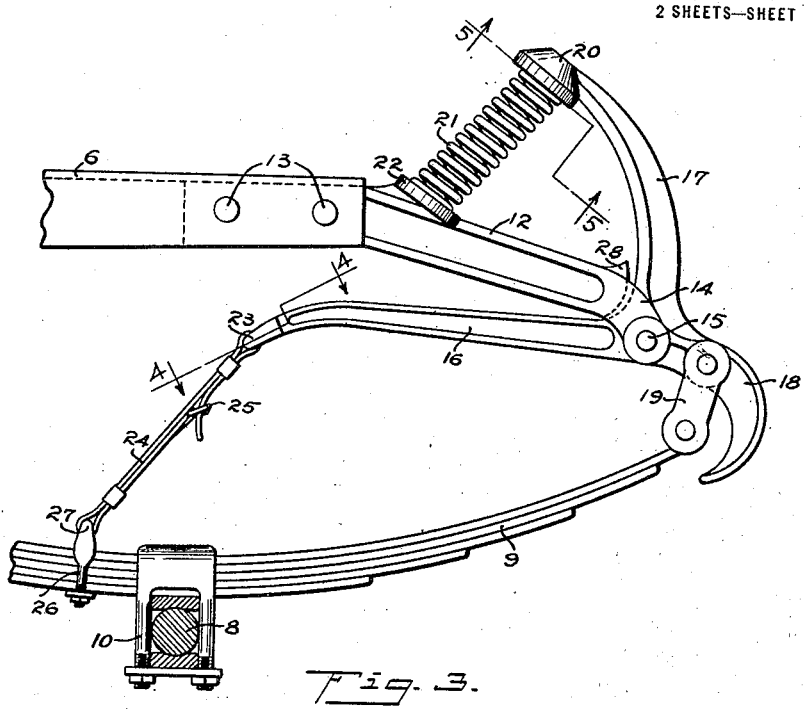
Figure 4:
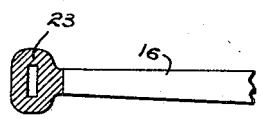
Figure 5:
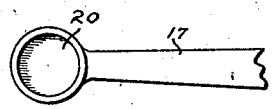

In the accompanying drawings, Fig. 1 is a side view of a device embodying my invention, the parts being in normal position, Fig. 2 is a similar view showing the positions of the parts when the frame is below the normal relation to the axle, Fig. 3 is a similar view showing the parts in the rebound position, or with the frame above normal relation to the axle, Fig. 4 is a detail sectional view on the line 4—4 of Fig. 3, and Fig. 5 is a detail sectional view on the line 5—5 of Fig. 3.

Referring to the drawings, there is indicated the rear portion of one of the side-members 6 of a vehicle frame, together with a wheel 7, axle 8, semi-elliptic spring 9, clamp 10 for securing the spring 9 to the axle 8, and a shackle 11 for connecting the front end of the spring 9 to the frame-member 6, all of which are of ordinary construction and arrangement. It will be understood that in the usual construction of vehicles of this kind which employ three-quarter elliptical springs, the quarter-elliptic spring is secured rigidly to the rear end-portion of the frame-member 6 and extends back therefrom, the rear end of said spring being shackled to the rear end of the spring 9.

In applying my shock-absorbing device to a vehicle previously equipped with three-quarter elliptic springs, as above noted, I remove the upper or quarter-elliptic portion of the spring, and substitute therefor a rigid extension-arm 12, which is fixedly secured to the frame-member 6 by bolts or rivets 13, as shown. The rear end of the extension-arm is divided to form a fork 14 through which a pin 15 extends transversely. On said pin is pivotally mounted a lever having an arm 16 which extends forwardly beneath the arm 12, a curved arm 17 which extends upwardly and forwardly, and a curved arm 18 which extends rearwardly and downwardly from the pin 15, as shown. A shackle 19 is pivotally connected with the rear end of the spring 9 and the intermediate portion of the arm 18, as shown. The upper end of the arm 17 has formed integrally therewith a cup 20 which provides a seat for one end of a coiled compression-spring 21, the opposite end of said spring being seated in a cup 22 formed integrally with the extension arm 12 and upon the upper side thereof. The forward end of the arm 16 is provided with an eye 23 through which is passed a strap 24, said strap having at one end a buckle 25, and the other end-portion having suitable perforations, whereby the strap may form a flexible connecting member of adjustable length. On the spring 9, near the axle-clamp 10, there is fixedly secured a clamp 26 having at the upper part thereof an eye 27 to which the strap 24 is connected, whereby to limit upward movement of the forward end of the arm 16. Downward movement of the arm 16, or rather, pivotal movement of the triple-armed lever as a whole in a direction such that the end of the arm 16 moves downwardly, is positively limited by a stop or abutment 28 formed at the fork of the extension-arm 12 and adapted to be engaged by the lower portion of the lever-arm 17 at the limit of said pivotal movement.

The length of the strap 24 is so adjusted that the same will be taut when the parts are in the normal positions shown in Fig. 1, wherein it is assumed that the vehicle is stationary on moving over a smooth surface and the frame carrying an average or normal load. Under said conditions, the spring 21 is under moderate compression, or sufficient to balance the tendency of the triple-armed lever to rotate about the pin 15, due to the load on said pin and the supporting of said load at the shackle 19. When the effective load upon the frame is increased, as by the momentum of the actual load when the level of the vehicle is suddenly lowered by the running of the wheels into depressions of the road, the spring 21 is further compressed and the triple-armed lever is rotated about the pin 15, while the strap 24 becomes slack, as shown in Fig. 2, wherein the frame is lower or closer to the axle than in the normal position. It will thus be seen that the spring 21 cooperates with the semi-elliptic spring 9 in yieldingly sustaining the frame-load and cushioning downward movements thereof. After sudden increase of the effective or apparent frame-load, the recoil or rebound of the springs tends to move the frame to a position above the normal. In approaching such a position, however, after the strap 24 becomes taut at the normal position, the pull of the strap on the forward end of the arm 16 again rotates the triple-armed lever and compresses the spring 21, as represented in Fig. 3, so that said spring thereby yieldingly resists the upward movement of the frame and materially reduces the extent and violence of the rebound.

It will be obvious that when a vehicle is originally constructed with my shock-absorbing device as a part thereof, the extension-arm 12 may be an integral part of the frame-member 6, instead of being made separately and attached thereto, as hereinbefore described and shown in the drawings.

Now, having described my invention, what I claim and desire to secure by Letters Patent is:

1. In a shock-absorbing device of the class described, the combination with a frame-member, an axle extending transversely of said frame-member; and a leaf-spring extending longitudinally of the frame-member, said spring being secured to said axle and shackled at one end to said frame-member, of a triple-armed lever pivotally connected with the frame-member, said lever having one arm shackled to the leaf-spring and the other arms thereof extending on opposite sides of the frame-member, a spring disposed between the frame-member and one of said last-named arms, and a flexible tension-member connected with the other of said arms and limiting movement thereof relative to the axle.

2. In a shock-absorbing device of the class described, a rigid frame-extension arm adapted for fixed connection with a vehicle frame-member, a lever pivotally connected with said extension-arm, said lever having an arm provided with a spring-seat, an expansible spring arranged between said spring-seat and a similar seat formed on the extension-arm, said lever having a second arm adapted for connection mediately with an axle, whereby to tend to actuate the lever rotatively by relative movements of the axle and frame-member, said lever having a third arm, and means for limiting movement of said third arm relative to the axle, whereby to reverse the rotative direction of the pivoted lever at the moment when the relation of the axle and frame-member passes from one side to the other of a normal relationship.

3. In a device of the class described, in combination, an expansible coil spring; an extension arm having means for rigid attachment to the frame of a vehicle to extend longitudinally thereof and having means forming an abutment for said coil spring; a lever pivotally connected with said extension arm and comprising a long arm, a short arm, and an arm engaging said coil spring; a shackle connecting said short arm of said lever with a resilient member carried by the axle of the vehicle, and a non-extensible member connected with the long arm of said lever and limiting movement thereof relative to the axle.

4. In a device of the class described, in combination, an extension-arm having means for securing the same at one end to the frame of a vehicle; a lever comprising a short arm, a long arm, and a spring-engaging arm; an expansible spring disposed between said last-named arm and the extension-arm; means pivotally connecting said lever and the extension-arm; means pivotally connecting the short arm of the lever with the free end of a semi-elliptic spring carried on the axle of the vehicle; and a strap connected with the long arm of the lever and adapted to limit movement thereof away from the axle while permitting free movement thereof toward the axle.

FRANK A. DOLEZAL.